Patented Mar. 31, 1925.

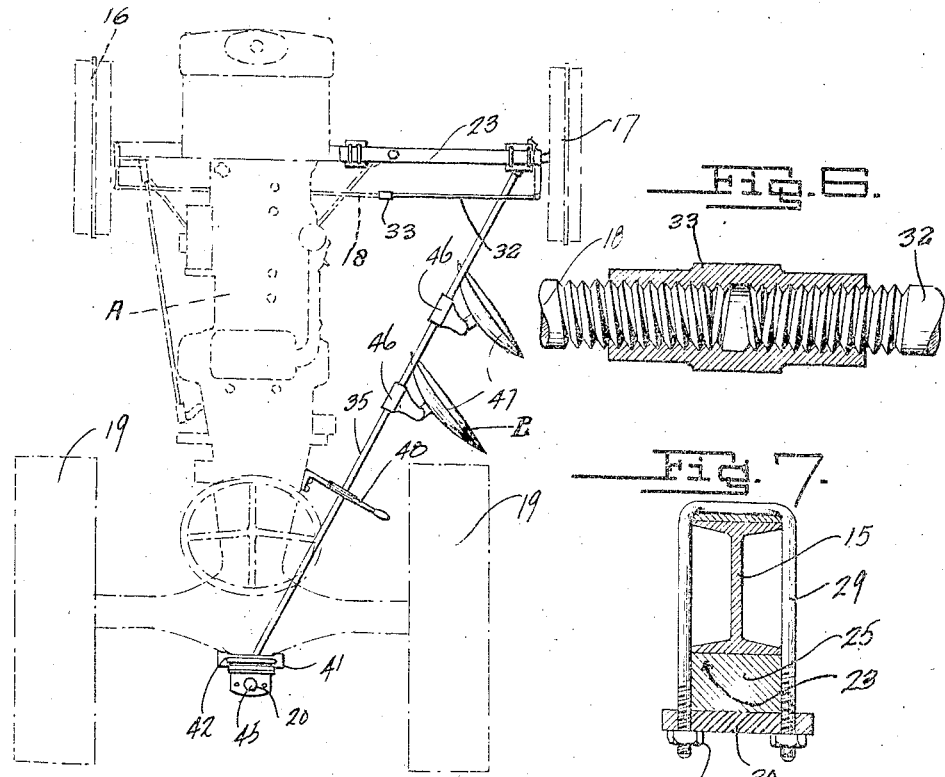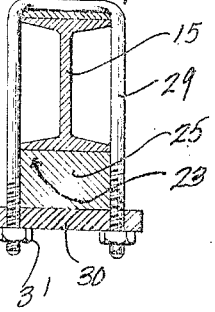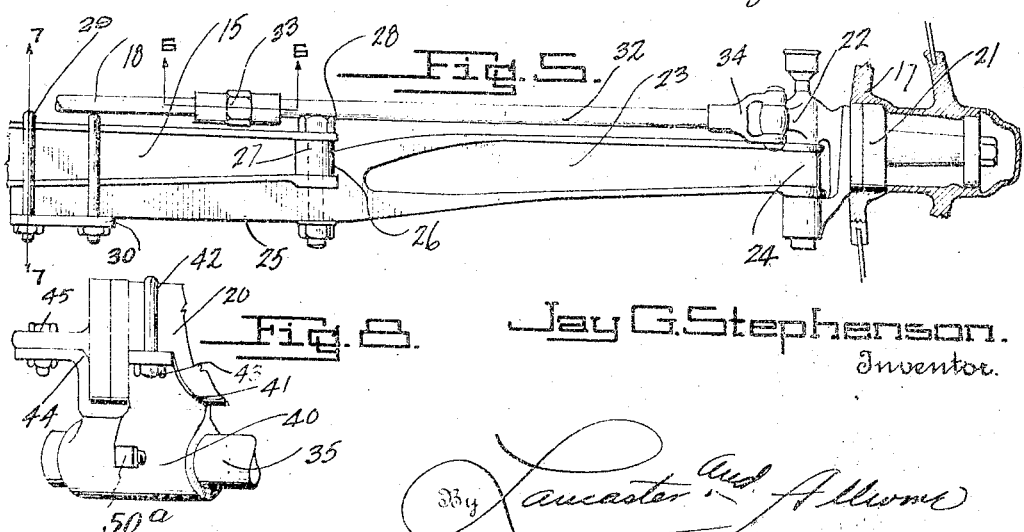

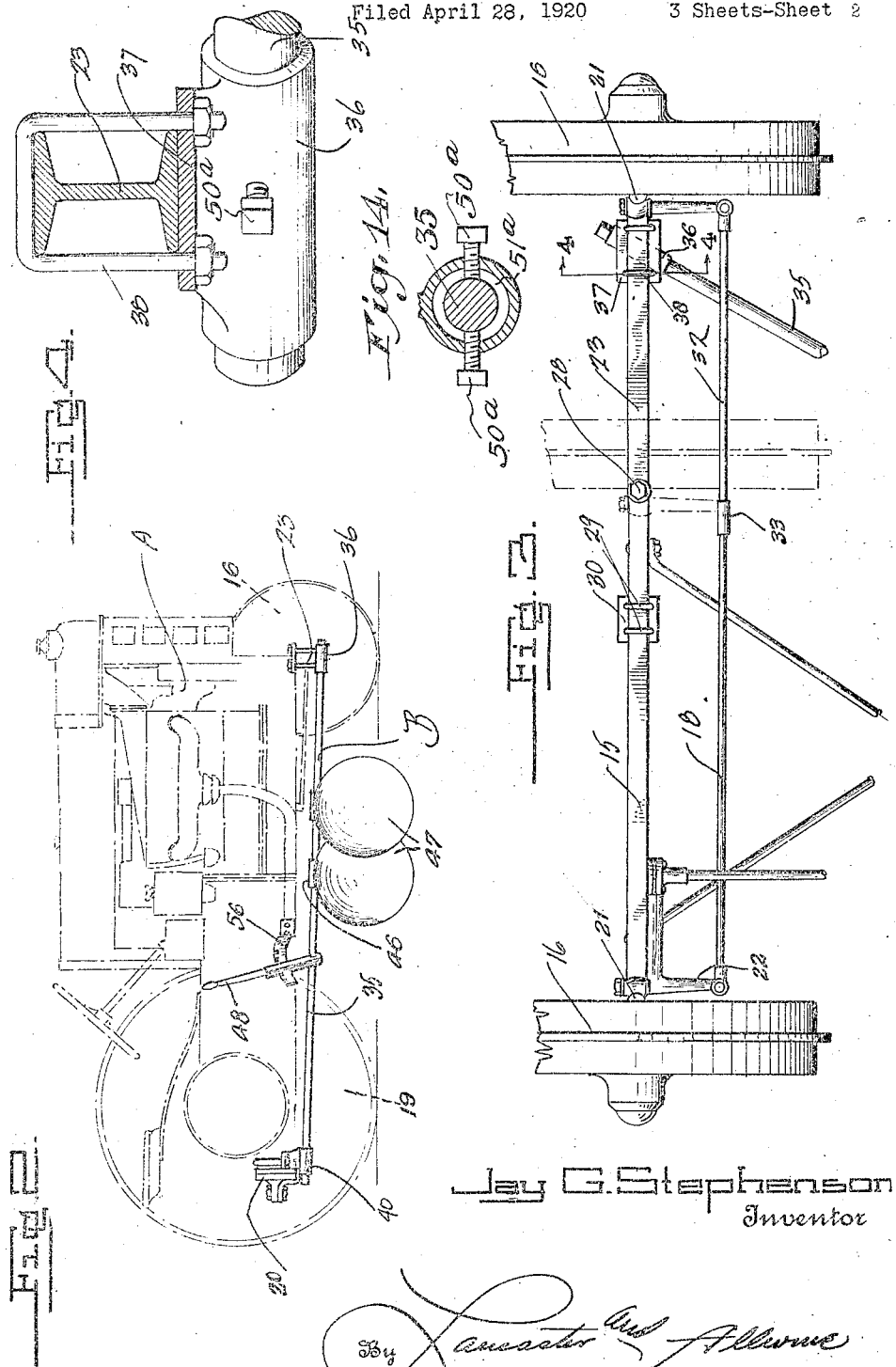

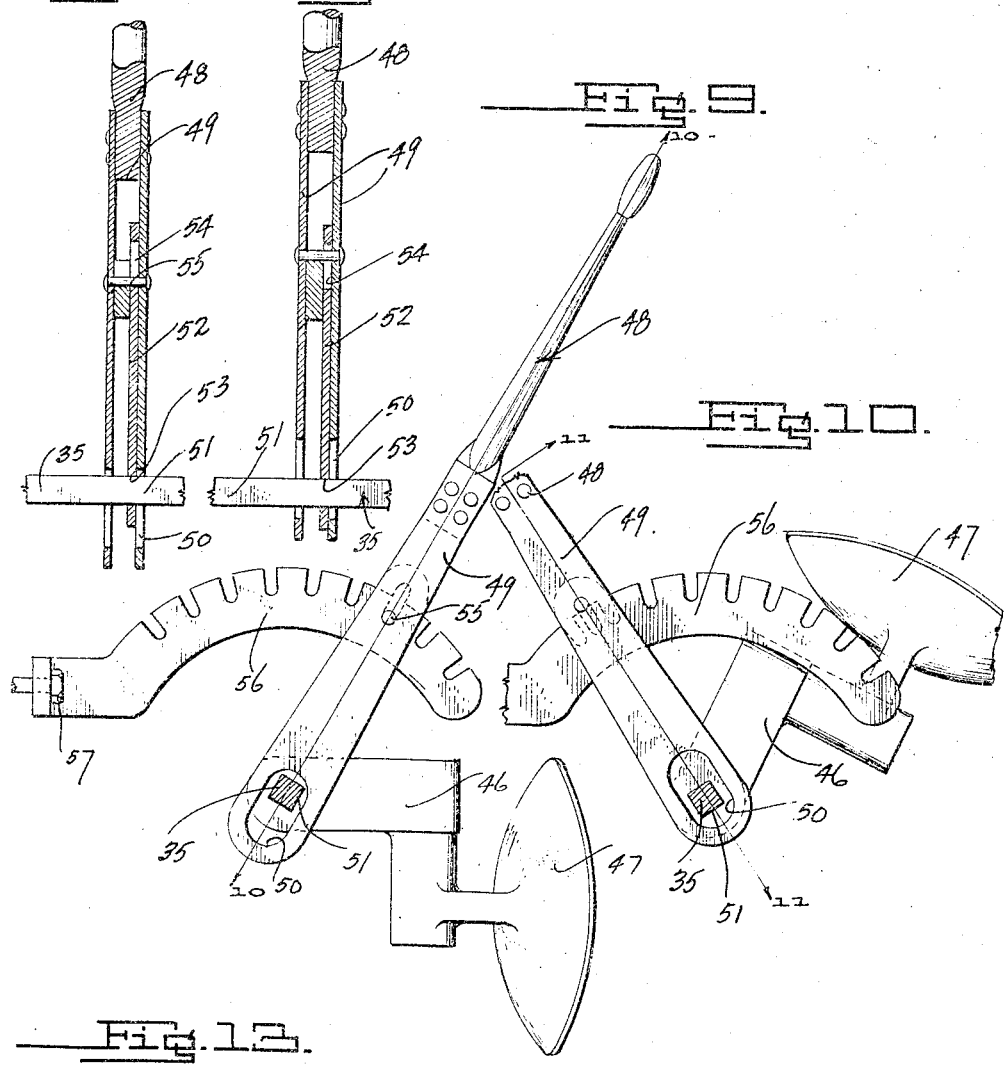
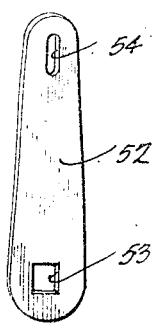

1,531,581

UNITED STATES PATENT OFFICE.

JAY GOULD STEPHENSON, OF ATHENS, TENNESSEE, ASSIGNOR, BY MESNE ASSIGNMENTS, TO ATHENS PLOW COMPANY, A CORPORATION OF TENNESSEE.

TRACTOR PLOW.

Application filed April 28, 1920. Serial No. 377,232.

*To all whom it may concern:*

Be it known that I, JAY G. STEPHENSON, a citizen of the United States, residing at Athens, in the county of McMinn and State of Tennessee, have invented certain new and useful Improvements in Tractor Plows, of which the following is a specification.

This invention relates to tractor plows and the primary object of the invention is to provide an improved tractor and an improved means for associating a plow therewith, so as to permit the use of a relatively light plow and overcome the side draft on the tractor and to prevent the shifting of the plows when plowing on a hillside.

Another object of the invention is the provision of a tractor in which the plows are arranged at one side of the longitudinal medial plane thereof and between the front and rear wheels, the power being delivered at an angle to the direction of the tractor, the wheels being arranged that one front wheel rides in the last furrow previously plowed and the companion rear wheel in a furrow being plowed, thereby effectively holding the tractor to its course and preventing the sliding of the plows.

A further object of the invention is the provision of a tractor having its one front wheel extended laterally beyond the companion rear wheel so as to engage in the last furrow previously plowed and having the plow so arranged in relation to the tractor that the said companion rear wheels will ride in a furrow being plowed, the front wheels being connected together in such a manner as to permit the adjustment thereof to cause one of the same to do the leading.

A further object of the invention is the provision of an improved means for associating plows with the tractor so that the tractor can back up when necessary and turn square corners.

A further object of the invention is the provision of an improved means for raising and lowering the plows and means for automatically releasing the plows when a hard buried object is struck so as to prevent the breaking of the plow and strain on the tractor.

Another object of the invention is to so support and dispose the plows with respect to the tractor, that the weight of the tractor will aid in maintaining the plows in the ground, whereby relatively deep plowing may be accomplished, and whereby side swaying of the tractor is prevented as it travels over the field, by the engagement of the plows in the ground having a stabilizing effect, so to speak, on the tractor.

A still further object of the invention is the provision of an improved tractor plow of the above character, which is durable and efficient in use, one that is simple and easy to manufacture, and one which can be placed upon the market at a reasonable cost.

With these and other objects in view, the invention consists in the novel construction, arrangement and formation of parts as will be hereinafter more specifically described, claimed and illustrated in the accompanying drawing, forming a part of this specification, in which drawings:

Figure 1 is a plan view illustrating the means of associating the plows with a tractor.

Figure 2 is a side elevation illustrating the means of associating the plows with a tractor.

Figure 3 is a fragmentary enlarged plan view showing the front axle of a tractor and illustrating the means for extending the length thereof and the means for securing the plow supporting rod thereto.

Figure 4 is an enlarged detail transverse section through the front axle of a tractor taken on the line 4—4 of Figure 3 showing the means for connecting the plow supporting rod thereto.

Figure 5 is an enlarged fragmentary rear elevation of the front axle of a tractor showing the means for extending the length of the same and the length of the connecting steering rod for the front wheels.

Figure 6 is an enlarged detail section taken on the line 6—6 of Figure 5 illustrating the means for connecting the steering rod extension with the ordinary steering rod.

Figure 7 is a detail transverse section taken on the line 7—7 of Figure 6 illustrating the means for connecting the axle extension to the axle.

Figure 8 is an enlarged fragmentary side elevation showing the means for connecting the plow supporting rod to the draw bar cap of the tractor.

Figure 9 is an enlarged transverse section through the plow supporting beam illustrating the means of raising and lowering the plows and for holding the same in adjusted position.

Figure 10 is a similar view illustrating the plows in a raised position.

Figure 11 is a detail section taken on the line 11—11 of Figure 9 through the adjusting lever showing the same in a locked position.

Figure 12 is a detail section taken on the line 12—12 of Figure 11 through the adjusting lever showing the same in its unlocked position, and Figure 13 is a detail view of the link for connecting the adjusting lever with the supporting rod for the plow.

Figure 14 is a cross sectional view taken through one of the bearing sleeves which support the plow bar, showing by way of example means to prevent longitudinal movement of the plow supporting bar out of its bearing sleeves.

Referring to the drawings in detail, wherein similar reference characters designate corresponding parts throughout the several views, the letter A indicates a tractor, and B the plows associated therewith.

The tractor A may be of any preferred make or style, but as shown is of the Fordson type and includes the front axle 15, the front wheels 16 and 17, the connecting steering rod 18, the rear wheels 19, and the draw bar cap 20. The front wheels 16 and 17 are rotatably mounted in the usual manner on the stub axles 21 which carry the usual rearwardly extending steering arms 22. As clearly shown in Figure 1 of the drawings, the front wheel 17 is extended laterally of the rear wheel 19 so as to permit the same to ride in the furrow previously plowed and which necessitates the extension of the front axle 15 in any of several different ways. As shown in the drawings an extension bar 23 is provided which has its outer end provided with a bearing 24 for the ordinary spindle pin of the stub axle 21 located on that side. The inner end of the extension bar 23 is reduced in height, as at 25, which provides a shoulder 26, adapted to engage the outer end of the ordinary bearing 27 formed for the spindle pin of the stub axle. The reduced portion 25 of the extension bar 23 is provided adjacent to the shoulder 26 with an opening, which is adapted to align with the opening formed in the spindle pin bearing 27 of the axle 15 to receive a retaining bolt 28 which effectively holds the extension bar in position. The extreme inner end of the extension bar 23 is clamped in position by means of U-shaped bolts 29, which are extended around the axle 15 and the bar 23. The terminals of the U-shaped bolts 29 are positioned through a suitable clamping plate 30, to receive nuts 31 for engagement with the plate. The steering rod 18 may be lengthened in any preferred manner, so as to conform to the extended length of the front axle, and as shown, an auxiliary rod 32 is provided which has its inner ends threaded in a direction opposite to the rod 18, and these threaded ends are connected together by a turn buckle nut 33, which permits of the adjustment of the steering knuckles in relation to each other. The outer end of the rod 32 carries a U-shaped yoke 34 which is adapted to be connected to the steering arm or fork 22. Other methods of extending the steering rod can be employed, and the above form has been shown merely for the purpose of illustration.

The plow B includes a supporting rod, or beam 35, which is arranged at an angle to the longitudinal axis of the tractor wholly to one side of the longitudinal vertical medial plane of the frame and this rod can be secured at various points on the tractor, which varies according to the type of tractor being used. The front end of the supporting rod 35 is connected to the extension bar 23 by means of a sleeve 36 which receives said rod, and this sleeve 36 carries an attaching plate 37 which is clamped against the lower surface of the extension bar 23 by means of U-shaped bolts 38 which extend around said extension bar.

The rear end of the rod or supporting beam 35 is connected to the draw bar cap 20 of the tractor. The means for connecting the rear end of the rod 35 to the draw bar cap includes a supporting sleeve 40 having an arcuate extension 41 which is adapted to engage around the draw bar cap 20. This extension 41 is clamped in position on the draw bar cap by means of a semi-circular shaped bolt 42 which is extended around the upper surface of the draw bar cap. The lower ends of the bolt 42 are extended through suitable openings formed in the extension 41 and receive suitable nuts 43. The rear end of the sleeve 40 carries an angled bracket 44, which is bolted, as at 45, to the rear end of the draw bar cap. This prevents swinging movement of the sleeve 40 on the draw bar cap. The provision of the sleeves 36 and 40 for supporting the rod or supporting beam 35 permits the free rotation of the beam when necessary or desirable. The rod or supporting beam 35 has secured thereto at spaced points the plow supporting arms 46 which have secured thereto in the ordinary manner the plow disc 47. It is to be understood that one or more plow discs can be used according to the size of the tractor. A lever 48 is provided for rotating the rod or supporting beam 35 in the sleeves 36 and 40, so as to permit the raising or lowering of the plow disc 47 out of or in engagement with the ground. The lever 48 has secured to its lower end a pair of spaced plates 49, which are provided with slots 50 which loosely receive the squared portion 51 of the supporting beam 35. To permit of the rotation of the supporting beam when the lever 48 is actuated, a flat plate 52 is arranged between the plates 49, the lower end of which is provided with a polygonal opening 53 which snugly receives the squared portion 51 of the supporting beam 35. The upper end of the flat plate 52 is slotted, as at 54, and this slot is adapted to slidably receive a frangible pin 55 which is carried by the plates 49. The lever 48 can be connected to any portion of the rod or supporting beam 35 and may be placed in rear of or in front of the driver's seat. As shown in Figure 1 of the drawings, the lever 48 is arranged in front of the driver's seat and a sector rack 56 is secured, as at 57, to the front of the tractor. The sector rack 56 is arranged between the plates 49 so as to permit the lever to slide thereon and the plate 52 engages one face of the sector rack. The frangible pin 55 is adapted to engage between any of the teeth of the sector rack 56 for holding the lever 48 in its adjusted position and to operate the lever is first moved upwardly, which is permitted by the slot 50, and this movement will carry the frangible pin 55 above the outer surface of the rack 56 and thereby permit the operation of the lever. When the lever 48 is operated, the same carries the plate 52 therewith, and owing to the connection of the plate 52 with the rod or supporting beam 35, the supporting beam will be rotated in the sleeves 47 and 40 for urging the plow discs 36 into or out of engagement with the ground. In this manner the plow discs may be moved toward and away from the longitudinal center of the tractor frame to be positioned for various depths of plowing. When a hard object is struck by the plows 47 the frangible pin 55 will break and permit the free swinging of the rod or supporting beam 35, and thus breaking of the plow disc is prevented.

In use of the improved tractor, the wheel 17 is placed in the furrow previously plowed and the rear plow 47 is placed directly in front of the companion rear wheel 19 which latter travels in the last furrow being plowed. This absolutely prevents the plow discs from coming out of alignment with the furrows already plowed.

Many of several mechanical expedients may be used to prevent slipping of the plow supporting bar 35 longitudinally out of its supporting sleeves 36 and 40, and by way of example in Figure 14 is shown a plurality of retaining screws or members 50ª supported by the bearing sleeves 36 or 40, as the case may be, and extending into a suitable annular groove 51ª formed in the plow supporting bar 35. Other means may also be used, this being a matter within the ingenuity of any mechanic to devise.

From the foregoing description it can be seen that an improved tractor plow has been provided with which the use of relatively light plows is permitted, and which eliminates the heavy side draft now caused by the use and arrangement of the heavy plows now on the market, and permits the tractor to be used in turning sharp corners, backing up and for hillside plowing.

Changes in details may be made without departing from the spirit or scope of the invention; but,

I claim:

1. The combination with a tractor including a frame, a rear axle carried by the frame, traction wheels secured to the rear axle, a front axle having one end extended laterally beyond one of the traction wheels, stub axles carried by the terminals of the front axle, an adjustable steering rod connecting the stub axles together, of a plow associated with the tractor including a diagonally extending supporting beam, a sleeve carried by the extended portion of the axle adjacent to one of the steering wheels, a sleeve carried by the rear end of the frame, the terminals of the beam being rotatably mounted in said sleeves, plows rigidly carried by said beam and arranged inwardly of said extended axle, an adjusting lever movably carried by the beam, a sector rack secured to the frame and arranged to receive said lever, a plate rigidly connected to said beam and slidably associated with said lever, and a frangible pin slidably connecting said plate with said lever, the pin being arranged to engage the sector rack.

2. In a tractor plow including a frame, a front axle, a steering wheel carried by one end of the front axle, an extension bar rigidly secured to the opposite end of the axle, a steering wheel secured to said extension bar a plow beam, and means for securing the plow beam to the extension bar and frame.

3. In a tractor plow including a frame and a front axle, a steering wheel secured to one end of the front axle, an extension bar for the opposite end of the axle, the inner end of said extension bar being reduced in height to form a shoulder, the shoulder being adapted to engage the outer end of the axle, said extension bar having an opening formed therein adjacent to the shoulder and in alignment with the spindle pin bearing, a bolt extended through the opening and said spindle pin bearing, clamps carried by the inner end of the extension bar and said axle, a steering wheel secured to the outer end of the extension bar, an adjustable steering rod connecting said steering wheels, and a diagonally extending plow beam, and means for securing the plow beam to the tractor frame and to the extension bar.

4. A tractor plow comprising a frame, front running gear for the frame, rear running gear for the frame including spaced supporting wheels and an axle housing, a draw bar cap fixed on the housing substantially midway between the wheels of the rear running gear, a rod connected adjacent its rear end to said draw bar cap and extending forwardly of the tractor entirely to one side of the longitudinal axis of the tractor, and a plow carried by said rod at a point forwardly of said draw bar cap in such relation to said draw bar cap that incident to a plowing operation forces will be directly transmitted to said draw bar cap and axle housing.

5. A tractor plow comprising a frame portion, rear running gear for the frame, front running gear for the frame offset at one side of the frame farther than at the other side, and a plow beam construction supported at its rear end by the rear running gear, and at its front end bearing for pivotal movement about its axis as a center at the outer end at the farthest offset of the front running gear.

6. A tractor plow comprising a frame, front running gear, rear running gear including wheels and axle housing, a draw bar cap fixed on the housing substantially midway between the wheels of the rear running gear, a supporting construction connected at its rear end to said draw bar cap and extending forwardly of the tractor, and a plow carried by said supporting construction at a point forwardly of said draw bar cap in such relation thereto that incident to a plowing operation forces will be directed to said draw bar cap.

7. A tractor plow comprising a frame, rear running gear for supporting the frame including a differential or axle housing, front running gear for the frame including an axle offset for a greater distance at one side of the frame than at the other side of the frame, and a plow beam construction supported at its rear end by the differential housing and extending diagonally therefrom for support at its forward end by the farthest offset end of the axle of the front running gear.

8. A tractor plow comprising an elongated frame including a draw bar cap, traction wheels supporting said frame at one end thereof and relatively disposed at equal distances upon opposite sides of the longitudinal axis of the frame, steering wheels supporting the other end of the frame relatively disposed at unequal distances at opposite sides of the longitudinal axis of the frame, and a plow beam construction supported at one end by the draw bar cap and at its other end by the frame adjacent the steering wheel farthest spaced from the longitudinal axis of the frame.

9. A tractor plow comprising an elongated frame including a draw bar cap, traction wheels supporting said frame at one end thereof and relatively disposed at equal distances upon opposite sides of the longitudinal axis of the frame, steering wheels supporting the other end of the frame relatively disposed at unequal distances at opposite sides of the longitudinal axis of the frame, a plow beam construction supported at one end by the draw bar cap and at its other end by the frame adjacent the steering wheel farthest spaced from the longitudinal axis of the frame, the beam of said plow beam construction being so supported at its ends that the same may be moved about its axis as a center for operating plows in or out of engagement with a ground surface.

10. A plow attachment for tractors comprising a detachable axle extension construction, and a plow beam construction adapted for attachment to the tractor frame at one end and at its other end to said front axle extension.

11. A tractor plow comprising a frame, running gear, a draw bar cap carried by said tractor at the rear thereof, a supporting construction connected at its rear end to said draw bar cap and extending forwardly of the tractor and laterally of the longitudinal axis thereof, a plow carried by said supporting construction, and means for moving the plow toward or away from the longitudinal center of said tractor frame to position the plow for various depths of plowing.

12. A tractor plow comprising a frame, running gear, a supporting construction connected at its rear end to the rear end of the tractor and extending forwardly of the tractor and laterally of the longitudinal axis of the tractor frame and including a bar mounted for rotation, a plow fixedly carried by said bar in offset relation laterally thereof, and means for moving the bar and holding it in a desired position for positioning the plow toward or away from the longitudinal center of said tractor frame.

JAY GOULD STEPHENSON.